United States Patent
Zes

(10) Patent No.: US 9,355,485 B2
(45) Date of Patent: May 31, 2016

(54) VISUALIZATION INTERFACE FOR WORD CLOUD

(71) Applicant: Korn Ferry International, Los Angeles, CA (US)

(72) Inventor: David A. Zes, Long Beach, CA (US)

(73) Assignee: Korn Ferry International, Los Angeles, CA (US)

( * ) Notice: Subject to any disclaimer, the term of this patent is extended or adjusted under 35 U.S.C. 154(b) by 8 days.

(21) Appl. No.: 14/204,721

(22) Filed: Mar. 11, 2014

(65) Prior Publication Data

US 2015/0262401 A1    Sep. 17, 2015

(51) Int. Cl.
*G09G 5/00* (2006.01)
*G06T 11/60* (2006.01)
*G06T 11/40* (2006.01)
*G06T 7/60* (2006.01)

(52) U.S. Cl.
CPC ............. *G06T 11/60* (2013.01); *G06T 7/602* (2013.01); *G06T 11/40* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 7,659,914 B1* | 2/2010 | Rostami | 345/636 |
| 2001/0004402 A1* | 6/2001 | Katayama | 382/162 |
| 2004/0205602 A1* | 10/2004 | Croeni | 715/517 |
| 2005/0195159 A1* | 9/2005 | Hunleth et al. | 345/156 |
| 2011/0193873 A1* | 8/2011 | Son et al. | 345/589 |
| 2013/0007661 A1* | 1/2013 | Klappert et al. | 715/811 |
| 2014/0267414 A1* | 9/2014 | Conlan et al. | 345/633 |

* cited by examiner

*Primary Examiner* — David H Chu
(74) *Attorney, Agent, or Firm* — Morrison & Foerste LLP

(57) ABSTRACT

A word cloud can quickly convey relative importance of words by displaying relatively important words larger than relatively unimportant words. Examples of the disclosure are directed to methods of generating a word cloud inside a predetermined polygon of arbitrary shape and size. For example, a word cloud may be generated with words to describe a particular company, and the word cloud may be generated inside the predefined shape of that company's logo, creating a single visualization that both describes and identifies the company. Further, whereas a traditional word cloud may illustrate relative word importance through relative word size, based on relative frequency of each word in a description or corpus, examples of the disclosure are directed to word clouds that can represent multiple dimensions of information for each word using size and color, for example.

15 Claims, 5 Drawing Sheets

VISUALIZATION INTERFACE FOR WORD CLOUD

FIELD OF THE DISCLOSURE

This relates generally to an interface for generating a word cloud.

SUMMARY

A word cloud can quickly convey relative importance of words by displaying relatively important words larger than relatively unimportant words. Examples of the disclosure are directed to methods of generating a word cloud inside a predetermined polygon of arbitrary shape and size. For example, a word cloud may be generated with words to describe a particular company, and the word cloud may be generated inside the predefined shape of that company's logo, creating a single visualization that both describes and identifies the company. Trivial algorithms may be used to arrange words inside a predefined shape, but searching for a maximum word size that fills the shape without crossing the boundaries of the shape can be computationally intensive. Examples of the disclosure are directed to a method of quickly searching for such a maximum word size.

Further, whereas a traditional word cloud may illustrate relative word importance through relative word size, based on relative frequency of each word in a description or corpus, examples of the disclosure are directed to word clouds that can represent multiple dimensions of information for each word. That is, each word may be associated with multiple scores, and each score may be visualized in a different manner. For example, each word may be a psychometric descriptor, such as a career competency, associated with two scores. The first score may be a measure of how well the psychometric descriptor describes a particular employee, for example, as determined by user input on a self-assessment. A word having a relatively high first score may be displayed relatively large in the word cloud for the particular employee, indicating that the word describes the particular employee relatively well. The second score may be a psycho construct score associated with the particular psychometric descriptor. For example, the psycho construct score may indicate how strongly the particular psychometric descriptor is associated with a personality factor such as warmth. If the psychometric descriptor is strongly associated with a warm personality, then the word may have a warm color in the word cloud such as orange. If the psychometric descriptor is more associated with a cool personality, then the word may have a cool color in the word cloud such as blue. In this example, the multi-dimensional visualization allows the word cloud to quickly convey both (1) a textual description of a particular employee, and (2) a personality factor of a particular employee (for example, if most of the relatively large words have relatively warm colors, then a viewer of the word cloud may readily infer that the employee has a relatively warm personality).

DETAILED DESCRIPTION

Figure 1:
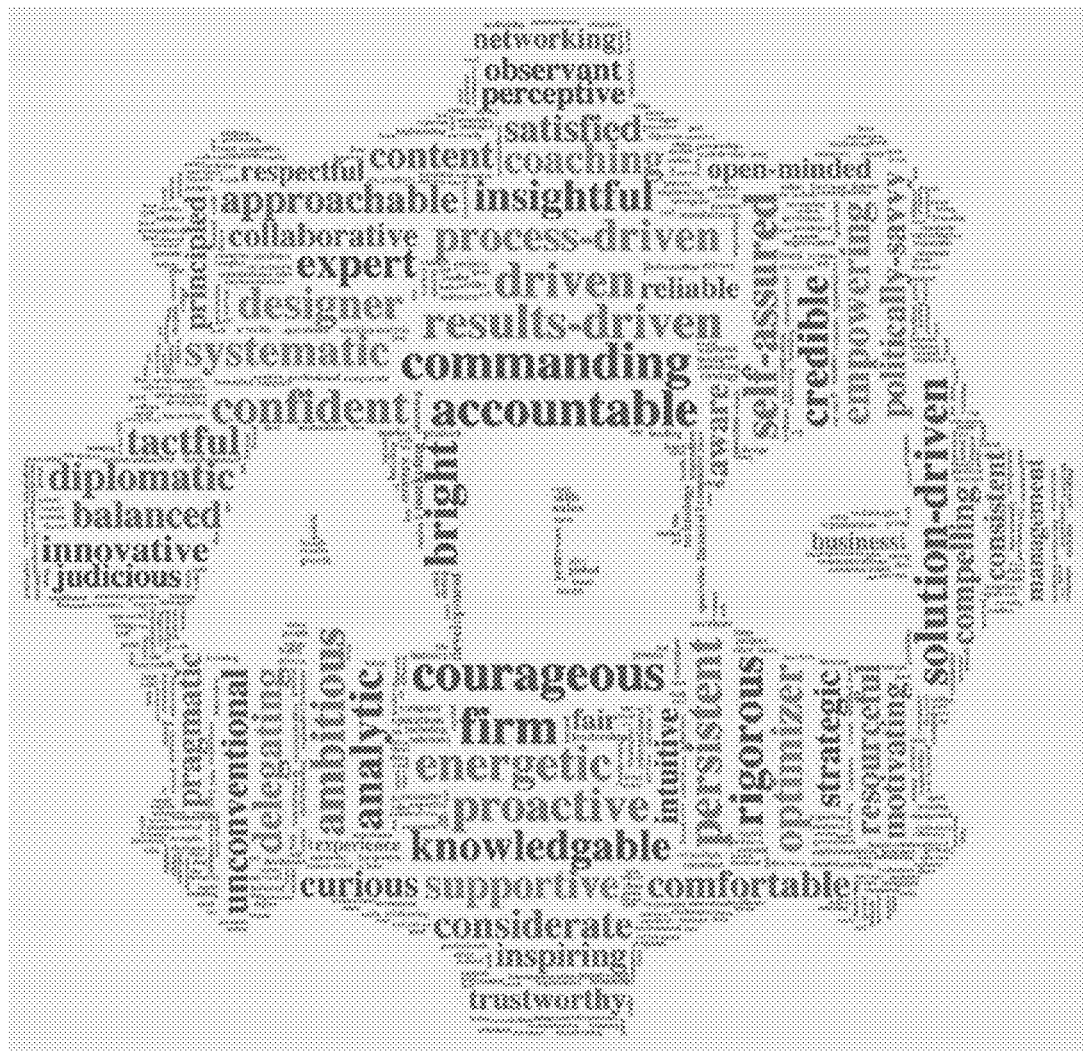
FIG. 1 illustrates an exemplary psychometric descriptor word cloud generated according to examples of the disclosure.

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

A word cloud can quickly convey relative importance of words by displaying relatively important words larger than relatively unimportant words. Examples of the disclosure are directed to methods of generating a word cloud inside a predetermined polygon of arbitrary shape and size. For example, a word cloud may be generated with words to describe a particular company, and the word cloud may be generated inside the predefined shape of that company's logo, creating a single visualization that both describes and identifies the company. Trivial algorithms may be used to arrange words inside a predefined shape, but searching for a maximum word size that fills the shape without crossing the boundaries of the shape can be computationally intensive. Examples of the disclosure are directed to a method of quickly searching for such a maximum word size.

Further, whereas a traditional word cloud may illustrate relative word importance through relative word size, based on relative frequency of each word in a description or corpus, examples of the disclosure are directed to word clouds that can represent multiple dimensions of information for each word. That is, each word may be associated with multiple scores, and each score may be visualized in a different manner. For example, each word may be a psychometric descriptor, such as a career competency, associated with two scores. The first score may be a measure of how well the psychometric descriptor describes a particular employee, for example, as determined by user input on a self-assessment. A word having a relatively high first score may be displayed relatively large in the word cloud for the particular employee, indicating that the word describes the particular employee relatively well. The second score may be a psycho construct score associated with the particular psychometric descriptor. For example, the psycho construct score may indicate how strongly the particular psychometric descriptor is associated with a personality factor such as warmth. If the psychometric descriptor is strongly associated with a warm personality, then the word may have a warm color in the word cloud such as orange. If the psychometric descriptor is more associated with a cool personality, then the word may have a cool color in the word cloud such as blue. In this example, the multi-dimensional visualization allows the word cloud to quickly convey both (1) a textual description of a particular employee, and (2) a personality factor of a particular employee (for example, if most of the relatively large words have relatively warm colors, then a viewer of the word cloud may readily infer that the employee has a relatively warm personality).

FIG. 1 illustrates an exemplary psychometric descriptor word cloud generated according to examples of the disclosure. The word cloud has been generated such that the words fit inside a predetermined polygon having the shape of a gear with the letters A, B, and C cut out of the center. Further, as described above, each of the words have a relative size determined based on a first score and a relative color determined based on a second score. Although FIG. 1 illustrates words in one of two orthogonal orientations, examples of the disclosure may have words in any number of orientations. In some examples, a word cloud may be generated having words in only a single orientation.

Figure 2:
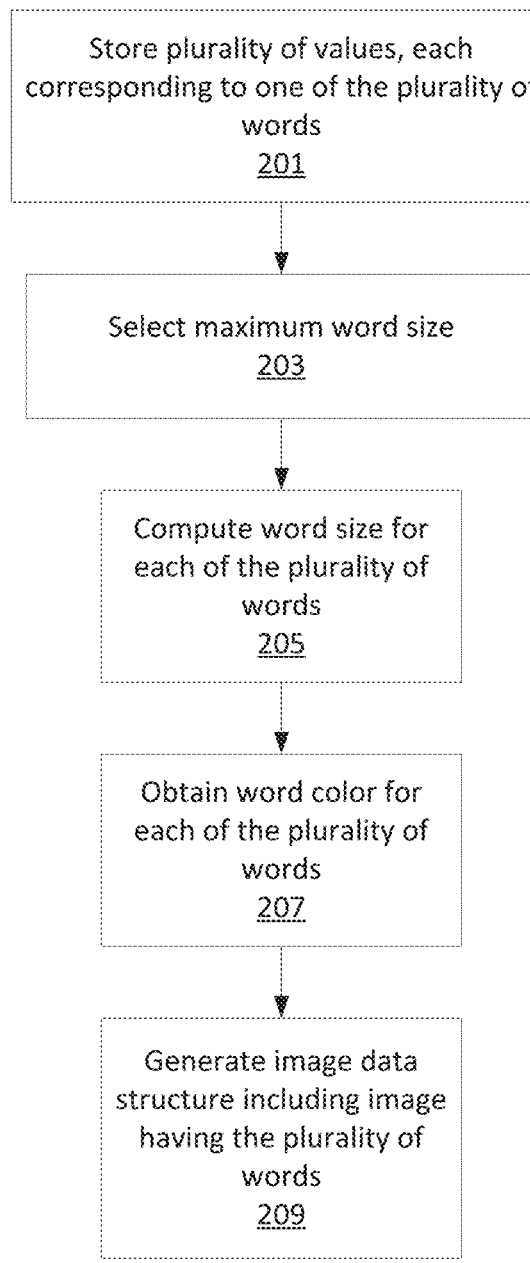
FIG. 2 illustrates an exemplary method of generating a word cloud according to examples of the disclosure.

FIG. 2 illustrates an exemplary method of generating a word cloud according to examples of the disclosure. A word cloud may comprise a plurality of words arranged inside a predefined shape. A plurality of values may be stored in a computer readable medium, each value corresponding to one of the plurality of words (201). In some examples, more than one value may be stored for each word. For example, each word may be associated with a first score and a second score as discussed above. In some examples, each of the plurality of values may be a proportion indicating a relative word size.

A maximum word size may be selected (203). The maximum word size may be determined relative to the predefined shape inside which the words will be arranged. Methods of selecting a maximum word size are described below with reference to FIGS. 3 and 4.

Once a maximum word size has been selected, a word size may be computed for each of the plurality of words based on the value corresponding to the word and the maximum word size (205). For example, if each of the plurality of values is a proportion indicating a relative word size, then each word size may be computed by multiplying the maximum word size by the proportion associated with the corresponding word.

A word color may be obtained for each of the plurality of words (207). In some examples, each word may have the same color. However, in some examples, a word color may be determined for a word based on a second score associated with that word. For example, the second score may be used to index a color gradient, and a color associated with the second score may be obtained in accordance with the color gradient. As discussed above, the second score may be a psycho construct score indicating how strongly the corresponding word is associated with a particular personality factor.

An image data structure may be generated, the image data structure including an image having the plurality of words arranged inside the predefined shape, each word having the corresponding word size and the corresponding word color (209). Further, in some examples, a word font may be determined for each word based on some attribute of the word, such as a score or category associated with the word. The words may be arranged according to any number of algorithms for arranging words inside a polygon. For example, a greedy algorithm may be used, first placing the largest words, and then recursing by filling the remaining space with the remaining words according to the same greedy algorithm.

Figure 3:
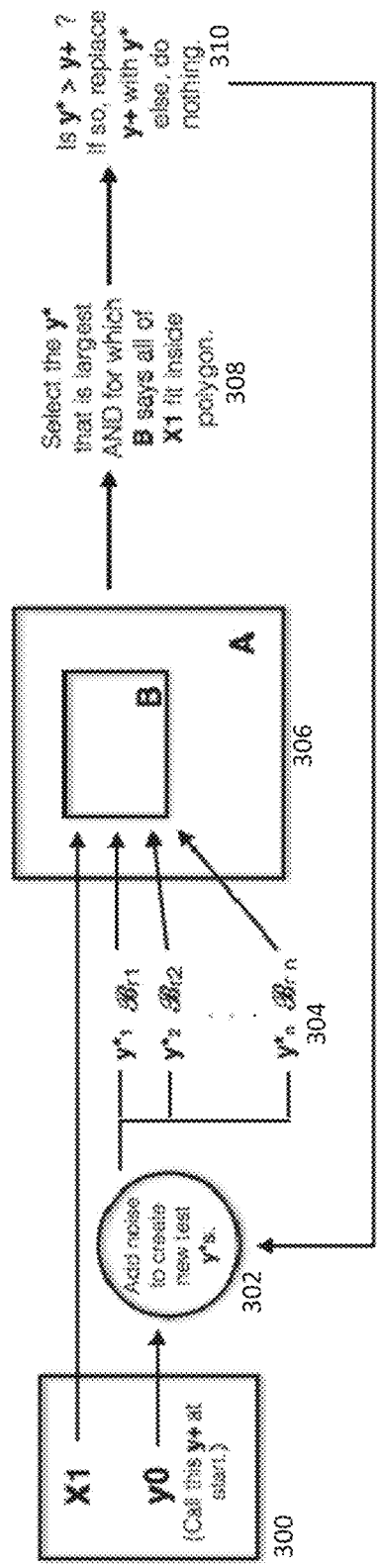
FIG. 3 illustrates an exemplary method of selecting a maximum word size for a word cloud according to examples of the disclosure.
Figure 4:
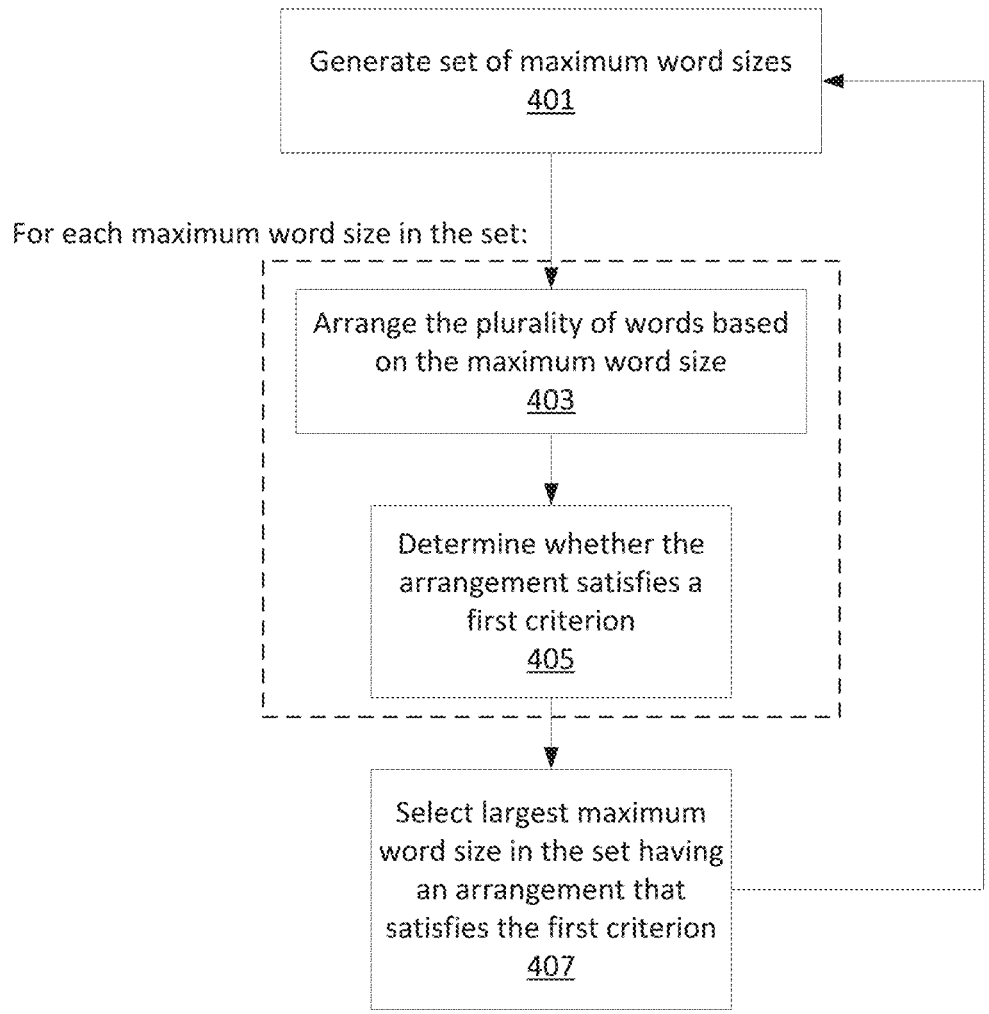
FIG. 4 illustrates an exemplary method of selecting a maximum word size for a word cloud according to examples of the disclosure.

FIGS. 3 and 4 illustrate an exemplary method of selecting a maximum word size for a word cloud according to examples of the disclosure. FIG. 3 illustrates a specific method for selecting a maximum word size, and FIG. 4 illustrates a more generalized method.

In FIG. 3, algorithm A may be any algorithm for placing words over two-dimensions such that the words do not overlap, and algorithm B may be a special case of algorithm A that can detect when a word lands outside an arbitrary, fixed polygon. Parameter set $\mathcal{B}$ may be a parameter set for algorithm A. Parameters for the algorithm A may include word rotation, coarseness or fineness of word placement, among other possibilities. Each instance $\mathcal{B}_r$ may be a randomly generated example of $\mathcal{B}$. The list X1 may be a list of words (e.g., psychometric descriptors), each of whose size can be expressed as a fixed proportion of the size of the largest word in X1, with the largest word having the fixed proportion 1.

The value y0 may be an initial size for the largest word in X1. The value y* may be a proposed size for the largest word in X1. The value y+ may be the current largest value for the largest word in X1.

First, the current largest maximum word size y+ may be set to the initial value y0 (300). Then noise may be added to y+ (302) to randomly generate a number of proposed sizes y* (304). A number of parameters sets $\mathcal{B}_r$ may be randomly generated as well. Each of the proposed size/parameter set pairs may be entered into algorithm B, along with the list of words and relative sizes X1 (306). Then, the largest y* may be selected for which algorithm B indicated all the words in X1 fit inside the fixed polygon (308). The selected y* may be set as the new y+ if y* is greater than the current y+ (310). The algorithm may be iterated again, starting at 302. In some examples, this method may be iterated a fixed number of times (e.g., 10, 30, or 100, among other possibilities) before selecting y+ as the maximum word size.

FIG. 4 illustrates a more generalized version of the method described with respect to FIG. 3. A set of maximum word sizes may be generated (401). In some examples, the set of maximum word sizes may be generated randomly based on an initial maximum word size or based on a maximum word size from a previous iteration of the method (i.e., a maximum word size selected at 407). For example, a set of maximum word sizes may be generated based on a normal distribution having a mean based on a maximum word size from a previous iteration of the method.

Then, for each maximum word size in the set, the plurality of words may be arranged based on the maximum word size (403) and it may be determined whether the arrangement satisfies a first criterion (405). The words may be arranged according to the greedy algorithm described above, among other possibilities. Further, the arrangement may be further based on a randomly generated parameter set. The first criterion may be that all the words in the arrangement fall inside the predefined shape (e.g., a fixed polygon such as a company logo), without crossing the boundaries of the shape.

The largest maximum word size in the set having an arrangement that satisfies the first criterion may be selected (407). Further, the selected maximum word size may be compared to a previously selected maximum word size (similar to 310 in FIG. 3). The method may begin another iteration at 401, or in some cases the selected maximum word size may be used to generate a word cloud, as described with respect to FIG. 2.

Although the methods described with respect to FIGS. 3 and 4 involve optimizing a maximum word size, other parameters may be similarly optimized alternatively or in addition to the optimization of the maximum word size. For example, a similar method could be employed to select parameters such as minimum word size, word density, or word kerning, among other possibilities. In some examples, the negative space within the predefined shape could be minimized according to similar methods.

In some examples, each word can be represented in the algorithm as a rectangular bounding box surrounding the word, and thus two words may be determined to be overlapping if their bounding boxes overlap even if the outlines of the letters do not overlap. In some examples, each word can be represented in the algorithm as the outline of its letters, so that two words will only be determined to be overlapping of the outlines of their letters overlap.

In some examples, two sets of words can be arranged in a word cloud. For example, a first set of words may be words describing a particularly employee, and a second set of words may be filler words used to fill in remaining empty spaces after the first set of words have been arranged. In such an example, the method as described in FIGS. 2-4 may be processed with just the first set of words. After the first set of words have been arranged inside the predefined shape, an additional predefined shape may be composed of the original predefined shape minus the first set of words as arranged. Then, the method as described in FIGS. 2-4 may be processed with the second set of words to arrange the second set of words inside the additional predefined shape. Such a method can allow the second set of filler words to fill in any extra spaces within the original predefined shape, and also up to the edges and in between the letters of the first set of words. The second set of filler words may be given a smaller maximum word size and/or a different color scheme than the first set of words, in some examples.

Figure 5:
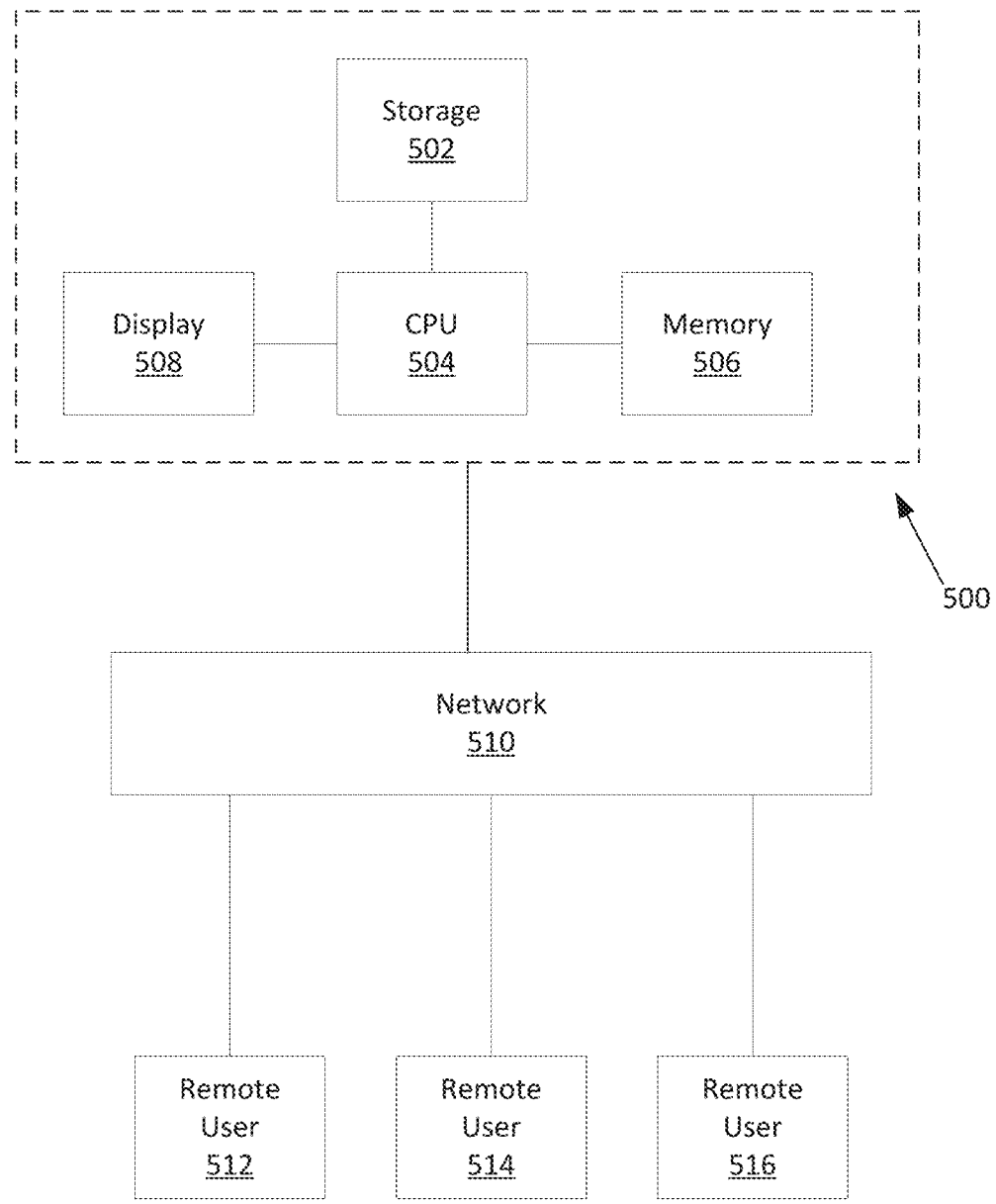
FIG. 5 illustrates an exemplary system for generating a word cloud according to examples of the disclosure.

FIG. 5 illustrates an exemplary system 500 for generating a visualization of catastrophic risk according to examples of the disclosure. The system 500 can include a CPU 504, storage 502, memory 506, and display 508. The CPU 504 can perform the methods illustrated in and described with reference to FIGS. 1-4. Additionally, the storage 502 can store data and instructions for performing the methods illustrated and described with reference to FIGS. 1-4. The storage can be any non-transitory computer readable storage medium, such as a solid-state drive or a hard disk drive, among other possibilities. A visualization as described in various examples may be displayed on the display 508.

The system 500 can communicate with one or more remote users 512, 514, and 516 over a wired or wireless network 510, such as a local area network, wide-area network, or internet, among other possibilities. The system 500 may transmit a visualization in the form of an image data structure to the one or more remote users for display.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A computer-implemented method of generating a visualization of a plurality of words inside a predefined shape, the method comprising:
at an electronic device including a computer readable medium, one or more processors, and a display:
storing, in the computer readable medium, a plurality of values, each corresponding to one of the plurality of words;
selecting, the one or more processors, a maximum word size;
computing, the one or more processors, a word size for each of the plurality of words based on the value corresponding to the word and the maximum word size;
obtaining, the one or more processors, a word color for each of the plurality of words; and
generating, the one or more processors, an image data structure for displaying on the display, the image data structure including an image having the plurality of words, each word having the corresponding word size and the corresponding word color;
wherein selecting the maximum word size includes:
generating, the one or more processors, a first set of maximum word sizes;
for each maximum word size in the first set,
arranging, using the one or more processors, the plurality of words such that a first word of the plurality of words has the maximum word size and remaining words of the plurality of words are not larger than the maximum word size, and
determining, using the one or more processors, whether the arrangement of the plurality of words satisfies a first criterion, the first criterion being that none of the words in the arrangement are outside the predefined shape;
selecting, the one or more processors, the largest maximum word size in the first set having an arrangement of the plurality of words that satisfies the first criterion.

2. The method of claim 1, wherein selecting the maximum word size further includes:
generating a second set of maximum word sizes based on the selected maximum word size from the first set;
for each maximum word size in the second set,
arranging the plurality of words such that a first word of the plurality of words has the maximum word size and remaining words of the plurality of words are not larger than the maximum word size, and
determining whether the arrangement of the plurality of words satisfies the first criterion; and
selecting the largest maximum word size in the second set having an arrangement of the plurality of words that satisfies the first criterion, wherein the selected maximum word size is the selected maximum word size from the second set.

3. The method of claim 1, wherein each of the plurality of values is a proportion, and computing the word size for each of the plurality of words includes multiplying the maximum word size by the proportion associated with the corresponding word.

4. The method of claim 1, wherein each of the plurality of values is determined based on a psychometric score associated with the corresponding word.

5. The method of claim 1, wherein obtaining the word color for each of the plurality of words includes determining the word color based on a psycho construct score associated with the word.

6. A non-transitory computer readable storage medium storing instructions executable to cause an electronic device, the electronic device including a computer readable medium, one or more processors, and a display, to perform a method of generating a visualization of a plurality of words inside a predefined shape, the method comprising:
storing, in the computer readable medium, a plurality of values, each corresponding to one of the plurality of words;
selecting, the one or more processors, a maximum word size;
computing, the one or more processors, a word size for each of the plurality of words based on the value corresponding to the word and the maximum word size;
obtaining, the one or more processors, a word color for each of the plurality of words; and
generating, the one or more processors, an image data structure for displaying on the display, the image data structure including an image having the plurality of words, each word having the corresponding word size and the corresponding word color;
wherein selecting the maximum word size includes:
generating, the one or more processors, a first set of maximum word sizes;
for each maximum word size in the first set,
arranging, using the one or more processors, the plurality of words such that a first word of the plurality of words has the maximum word size and remaining words of the plurality of words are not larger than the maximum word size, and determining, using the one or more processors, whether the arrangement of the plurality of words satisfies a first criterion, the first criterion being that none of the words in the arrangement are outside the predefined shape;

selecting, the one or more processors, the largest maximum word size in the first set having an arrangement of the plurality of words that satisfies the first criterion.

7. The non-transitory computer readable storage medium of claim 6, wherein selecting the maximum word size further includes:

generating a second set of maximum word sizes based on the selected maximum word size from the first set;

for each maximum word size in the second set,
arranging the plurality of words such that a first word of the plurality of words has the maximum word size and remaining words of the plurality of words are not larger than the maximum word size, and
determining whether the arrangement of the plurality of words satisfies the first criterion; and selecting the largest maximum word size in the second set having an arrangement of the plurality of words that satisfies the first criterion, wherein the selected maximum word size is the selected maximum word size from the second set.

8. The non-transitory computer readable storage medium of claim 6, wherein each of the plurality of values is a proportion, and computing the word size for each of the plurality of words includes multiplying the maximum word size by the proportion associated with the corresponding word.

9. The non-transitory computer readable storage medium of claim 6, wherein each of the plurality of values is determined based on a psychometric score associated with the corresponding word.

10. The non-transitory computer readable storage medium of claim 6, wherein obtaining the word color for each of the plurality of words includes determining the word color based on a psycho construct score associated with the word.

11. A non-transitory computer readable storage medium storing an image data structure produced by a method of generating a visualization of a plurality of words inside a predefined shape, the method comprising:

storing, in a computer readable medium, a plurality of values, each corresponding to one of the plurality of words;

selecting, one or more processors, a maximum word size;

computing, the one or more processors, a word size for each of the plurality of words based on the value corresponding to the word and the maximum word size;

obtaining, the one or more processors, a word color for each of the plurality of words; and generating, the one or more processors, the image data structure for displaying on a display, the image data structure including an image having the plurality of words, each word having the corresponding word size and the corresponding word color;

wherein selecting the maximum word size includes:
generating, the one or more processors, a first set of maximum word sizes;
for each maximum word size in the first set,
arranging, using the one or more processors, the plurality of words such that a first word of the plurality of words has the maximum word size and remaining words of the plurality of words are not larger than the maximum word size, and
determining, using the one or more processors, whether the arrangement of the plurality of words satisfies a first criterion, the first criterion being that none of the words in the arrangement are outside the predefined shape;
selecting, the one or more processors, the largest maximum word size in the first set having an arrangement of the plurality of words that satisfies the first criterion.

12. The non-transitory computer readable storage medium of claim 11, wherein selecting the maximum word size further includes:

generating a second set of maximum word sizes based on the selected maximum word size from the first set;

for each maximum word size in the second set,
arranging the plurality of words such that a first word of the plurality of words has the maximum word size and remaining words of the plurality of words are not larger than the maximum word size, and
determining whether the arrangement of the plurality of words satisfies the first criterion; and selecting the largest maximum word size in the second set having an arrangement of the plurality of words that satisfies the first criterion, wherein the selected maximum word size is the selected maximum word size from the second set.

13. The non-transitory computer readable storage medium of claim 11, wherein each of the plurality of values is a proportion, and computing the word size for each of the plurality of words includes multiplying the maximum word size by the proportion associated with the corresponding word.

14. The non-transitory computer readable storage medium of claim 11, wherein each of the plurality of values is determined based on a psychometric score associated with the corresponding word.

15. The non-transitory computer readable storage medium of claim 11, wherein obtaining the word color for each of the plurality of words includes determining the word color based on a psycho construct score associated with the word.

* * * * *